United States Patent
Arendt et al.

(10) Patent No.: US 12,316,551 B2
(45) Date of Patent: May 27, 2025

(54) METHOD FOR TRANSMITTING A DATA ELEMENT BETWEEN A FIRST CONTROL UNIT OF A VEHICLE AND A SECOND CONTROL UNIT OF THE VEHICLE, COMPUTER-READABLE MEDIUM, SYSTEM AND VEHICLE

(71) Applicant: Bayerische Motoren Werke Aktiengesellschaft, Munich (DE)

(72) Inventors: Christian Arendt, Munich (DE); Omid Pahlevan Sharif, Bad Homburg (DE); Markus Wudy, Oberschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 112 days.

(21) Appl. No.: 18/009,865

(22) PCT Filed: Jun. 17, 2021

(86) PCT No.: PCT/EP2021/066504
§ 371 (c)(1),
(2) Date: Dec. 12, 2022

(87) PCT Pub. No.: WO2022/048807
PCT Pub. Date: Mar. 10, 2022

(65) Prior Publication Data
US 2023/0269194 A1 Aug. 24, 2023

(30) Foreign Application Priority Data
Sep. 2, 2020 (DE) ..................... 10 2020 122 956.9

(51) Int. Cl.
*H04L 47/625* (2022.01)
*H04L 47/6275* (2022.01)
(Continued)

(52) U.S. Cl.
CPC ........ *H04L 47/626* (2013.01); *H04L 47/6275* (2013.01); *H04L 47/74* (2013.01); *H04L 47/805* (2013.01); *H04L 47/822* (2013.01)

(58) Field of Classification Search
CPC ... H04L 47/626; H04L 47/6275; H04L 47/74; H04L 47/805; H04L 47/822; H04L 47/83
See application file for complete search history.

(56) References Cited

U.S. PATENT DOCUMENTS

| | | | |
|---|---|---|---|
| 8,582,579 B2 | 11/2013 | Yousefi et al. | |
| 10,231,245 B1* | 3/2019 | Wang | .............. H04W 72/542 |

(Continued)

FOREIGN PATENT DOCUMENTS

| | | |
|---|---|---|
| DE | 102007013511 A1 | 9/2008 |
| DE | 102013217595 A1 | 3/2015 |

(Continued)

OTHER PUBLICATIONS

International Search Report corresponding to International Patent Application No. PCT/EP2021/066504, dated Oct. 1, 2021 (7 pages).

(Continued)

*Primary Examiner* — Chris Parry
*Assistant Examiner* — Dixon F Dabipi
(74) *Attorney, Agent, or Firm* — Maginot, Moore & Beck LLP

(57) ABSTRACT

A method transmits a data element between control units of a vehicle that are coupled via at least two communication channels. The first control unit determines a communication channel indicator of a first channel that is representative of available transmission resources. The first control unit receives a data element from a data source. The priority of the data element is ascertained depending on an associated vehicle application. If the communication channel indicator indicates that the available transmission resources of the first (Continued)

channel are insufficient for transmission of the data element and the priority of the data element is less than a predefined priority threshold value, then storing the data element in a temporary memory of the first control unit for a predefined time interval. In a different case, the data element is transmitted from the first control unit to the second control unit via assigned communication channel(s).

17 Claims, 2 Drawing Sheets

(51) Int. Cl.
*H04L 47/70* (2022.01)
*H04L 47/74* (2022.01)
*H04L 47/80* (2022.01)

(56) References Cited

U.S. PATENT DOCUMENTS

| | | | |
|---|---|---|---|
| 2003/0027594 A1* | 2/2003 | Pfoertner | H04M 1/6075 455/99 |
| 2005/0169262 A1* | 8/2005 | Kasper | H04L 12/66 370/389 |
| 2006/0233137 A1* | 10/2006 | Dantu | H04W 8/04 370/392 |
| 2009/0225777 A1 | 9/2009 | Dong et al. | |
| 2012/0106350 A1* | 5/2012 | Yousefi | H04N 7/183 370/328 |
| 2015/0023666 A1* | 1/2015 | Hashiguchi | H04L 41/0896 398/79 |
| 2016/0219606 A1* | 7/2016 | Amano | H04N 21/43637 |
| 2016/0352533 A1* | 12/2016 | Talty | H04L 12/4015 |
| 2017/0257227 A1* | 9/2017 | Endo | H04W 76/10 |
| 2019/0069510 A1 | 2/2019 | Endo et al. | |
| 2020/0304399 A1* | 9/2020 | Hitz | H04L 45/121 |

FOREIGN PATENT DOCUMENTS

| | | | |
|---|---|---|---|
| DE | 102015212951 A1 | 1/2017 | |
| EP | 3544247 A1 * | 9/2019 | B60R 16/023 |

OTHER PUBLICATIONS

German Search Report corresponding to German Patent Application No. 10 2020 122 956.9, dated May 3, 2021 (7 pages).

* cited by examiner

METHOD FOR TRANSMITTING A DATA ELEMENT BETWEEN A FIRST CONTROL UNIT OF A VEHICLE AND A SECOND CONTROL UNIT OF THE VEHICLE, COMPUTER-READABLE MEDIUM, SYSTEM AND VEHICLE

The present application is the U.S. national phase of PCT Application PCT/EP2021/066504 filed on Jun. 17, 2021, which claims priority of German patent application No. 102020112956.9 filed on Sep. 2, 2020, which is incorporated herein by reference in its entirety.

TECHNICAL FIELD

The disclosure relates to a method for transmitting a data element between a first control unit of a vehicle and a second control unit of the vehicle. The disclosure further relates to a computer-readable medium and a system for transmitting a data element between a first control unit of a vehicle and a second control unit of the vehicle, and a vehicle comprising the system.

BACKGROUND

Current vehicles are equipped with a multiplicity of control units which are used to control and regulate different vehicle functions. Different bus technologies which are based on a cable connection are known from the prior art for networking the multiplicity of control units of a vehicle. If high data rates, for example data rates in the region of 1 Gbit/s or a plurality of Gbit/s, between two or more control units are required, a cable-based networking of the multiplicity of control units can result in costs an additional and/or additional installation space requirement, since the cables used for this purpose frequently require an additional shielding which entails an additional installation space requirement.

An object, therefore, is to efficiently improve communication between the least two control units of a vehicle. In particular, an object is to exchange a data element efficiently between at least two control units.

SUMMARY

This object, as well as others, are achieved by the features of the designs and developments disclosed herein.

A first aspect is characterized by a method for transmitting a data element between a first control unit of a vehicle and a second control unit of the vehicle. The method can be a computer-implemented and/or a control-unit-implemented method. The vehicle can be a motor vehicle or a motorcycle. In particular, the vehicle can be a partially, highly or fully autonomously driven motor vehicle. The first control unit and the second control unit are coupled to one another via at least two communication channels.

The method comprises the first control unit determining a communication channel indicator of a first communication channel of the at least two communication channels, wherein the communication channel indicator is representative of available transmission resources of the first communication channel. The communication channel indicator can additionally or alternatively be representative of the quality of available transmission resources of the first communication channel. Additionally or alternatively, the communication channel indicator can be representative of the available transmission resources of the at least two communication channels between the first and the second control unit. The method further comprises the first control unit receiving a data element from a data source. The data source can be a further control unit of the vehicle, a mobile terminal coupled to the vehicle and/or a server outside the vehicle.

The method comprises ascertaining a priority of the data element depending on a vehicle application associated with the data element. If the communication channel indicator of the first communication channel indicates that the available transmission resources of the first communication channel are not sufficient for the transmission of the data element and the priority of the data element is less than a predefined priority threshold value, the method stores the data element in a temporary memory of the first control unit for a predefined time interval. If the communication channel indicator of the first communication channel indicates that the available transmission resources of the first communication channel are sufficient for the transmission of the data element and/or the priority of the data element is greater than a predefined priority threshold value, the method comprises assigning one or more communication channels of the at least two communication channels of the first control unit depending on the vehicle application associated with the data element, and transmitting the data element via the assigned one or more communication channels from the first control unit to the second control unit.

The data element can advantageously be transmitted via one or more communication channels according to the priority and available transmission resources. This increases flexibility in the transmission of the data element between the first and the second control unit. The communication between the two control units can further be improved and/or the robustness of the transmission of the data element can be increased through the assignment of the at least two communication channels for the transmission of the data element. The performance of the communication between the at least two control units can thus be efficiently increased.

According to one advantageous design, the communication channel indicator can be an estimated communication channel indicator which is representative of estimated available transmission of resources the first communication channel. The communication channel indicator can be estimated, for example, using known methods based on pilot signals and/or data signals of a transmission technology of a communication channel. The quality and/or the performance of the communication channel can thus be efficiently determined.

According to a further advantageous design, a first communication channel of the at least two communication channels can be a wired communication channel and a second communication channel of the at least two communication channels can be a wireless communication channel, or a first communication channel of the at least two communication channels be a wireless can communication channel and a second communication channel of the at least two communication channels can be a wireless communication channel. The method can efficiently combine a wireless communication channel with a further wireless communication channel or a wired communication channel in order to transmit the data element between the two control units.

According to a further advantageous design, the first control unit can be a first telematics control unit, and/or the second control unit can be a second telematics control unit. The first telematics control unit and/or the second telematics control unit can connect the vehicle to a mobile radio network. To do this, the first telematics control unit and/or the second telematics control unit can have a chip card for mobile radio access, known as an embedded Subscriber Identity Module, or eSIM for short. The wireless communication channel can further be a communication channel of a wireless, local network, and/or the wired communication channel can be a communication channel of an Ethernet network. The communication between two telematics control units of the vehicle can thus be efficiently improved.

According to a further advantageous design, the method can further comprise the first control unit determining a communication channel indicator of a second communication channel of the least two communication channels, wherein the communication channel indicator of the second communication channel is preferably an estimated communication channel indicator which is representative of preferably estimated available transmission resources of the second communication channel. If the communication channel indicator of the first communication channel and the communication channel indicator of the second communication channel indicate that the preferably estimated available transmission resources of the first communication channel and of the second communication channel are not sufficient for the transmission of the data element and the priority of the data element is less than a predefined priority threshold value, the method can store the data element in a temporary memory of the first control unit for a predefined time interval. Thus, a preferably lower-prioritized data element can initially be temporarily stored if the estimated transmission resources of the at least two communication channels are not sufficient for the transmission of the data element and/or a higher-prioritized data element is awaiting transmission and the estimated transmission resources are not sufficient for the transmission of the lower-prioritized data element and the higher-prioritized data element. Overloading of the estimated transmission resources of the at least two communication channels is efficiently prevented.

According to a further advantageous design, if the communication channel indicator of the first communication channel indicates that the available transmission resources of the first communication channel are not sufficient for the transmission of the data element and the priority of the data element is greater than a predefined priority threshold value, the method can further comprise assigning at least two communication channels of the at least two communication channels of the first control unit depending on the vehicle application associated with the data element, and transmitting the data element via the at least two assigned communication channels from the first control unit to the second control unit. The data element can thus be efficiently transmitted via at least two communication channels. The data element can be transmitted more quickly between the first and the second control unit.

According to a further advantageous design, assigning the one or more communication channels of the first control unit depending on the vehicle application associated with the data element can comprise receiving a communication profile, wherein the communication profile is linked to the vehicle application, and allocating the one or more communication channels of the at least two communication channels depending on the communication profile of the vehicle application. The communication channels between the first and the second control unit can thus be assigned more efficiently.

According to a further advantageous design, the communication profile of the vehicle application can specify one or more communication-channel-specific parameters which one or more communication channels of the at least two communication channels of the first control unit must fulfil for the transmission of the data element of the vehicle application. The at least two communication channels can thus be assigned more efficiently.

A further aspect is characterized by a computer-readable medium for transmitting a data element between a first control unit of a vehicle and a second control unit of the vehicle, wherein the computer-readable medium comprises instructions which, when executed on a control unit or computer, carry out the method described above.

A still further aspect is characterized by a system for transmitting a data element between a first control unit of a vehicle and a second control unit of the vehicle, wherein the system is designed to carry out the method described above.

A still further aspect is characterized by a vehicle comprising the system described above for transmitting a data element between a first control unit of a vehicle and a second control unit of the vehicle.

Further features are set out in the claims, the figures and the description of the figures. All features and feature combinations specified above in the description and also the features and feature combinations specified below in the description of the figures and/or shown in the figures alone are usable not only in the respectively indicated combination, but also in other combinations or in isolation.

BRIEF DESCRIPTION OF THE DRAWINGS

An exemplary embodiment is described below with reference to the attached drawings. Further details, preferred designs and developments are set out therein. In the individual, schematic figures.

DETAILED DESCRIPTION

Figure 1:
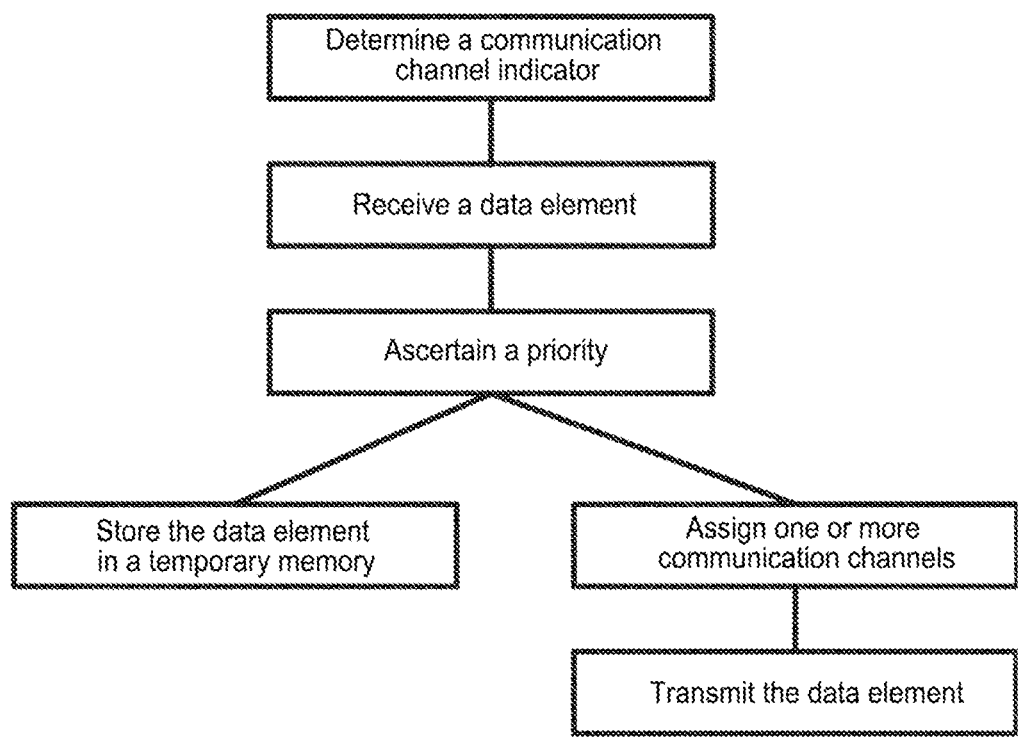
FIG. 1 shows an example of a method for transmitting a data element between a first control unit of a vehicle and a second control unit of the vehicle.

In detail, FIG. 1 shows a method 100 for transmitting a data element between a first control unit of a vehicle and a second control unit of the vehicle. The first control unit and the second control unit are coupled to one another via at least two communication channels. Each communication channel preferably has a different transmission technology. A communication channel can be a wireless or a wired communication channel. A wireless communication channel can use wireless, local networks, such as, for example, Wi-Fi or Bluetooth, as the transmission technology. A wired communication channel can use wired, local networks such as, for example, an Ethernet network or vehicle-specific bus systems, as the transmission technology.

The method 100 can determine 102 a communication channel indicator of a first communication channel of the at least two communication channels by means of the first control unit. The communication channel indicator is preferably representative of available transmission resources of the first communication channel. The method can determine the communication channel indicator for each wireless communication channel. Known methods, for example, for channel estimation using pilot signals and/or data signals of the respective wireless transmission technology can be used in order to determine the communication channel indicator. The communication channel indicator is preferably representative of the quality of available transmission resources of the communication channel.

The method 100 can receive 104 a data element from a data source by means of the first control unit. The data element can be received, for example, via a mobile radio link of the first control unit.

In order to enable an efficient data exchange of the data element between the first control unit and the second control unit, the method 100 can ascertain a priority of the data element and assign one or more communication channels via which the data element is finally transmitted. The method 100 can initially determine 106 a priority of the data element depending on a vehicle application associated with the data element. To do this, the method can categorize the data element into a predefined quality of service class on the basis of a time criticality of the data element and/or a relevance of the data element for further vehicle applications. A priority which defines the priority of the data element is linked to each quality of service class. The highest priority, for example, can also be linked to the highest quality of service class.

If the communication channel indicator of the first communication channel indicates that the available transmission resources of the first communication channel are not sufficient for the transmission of the data element and the priority of the data element is less than a predefined priority threshold value, the method 100 can store 108 the data element in a temporary memory of the first control unit for a predefined time interval. If the communication channel indicator of the first communication channel indicates that the available transmission resources of the first communication channel are sufficient for the transmission of the data element and/or the priority of the data element is greater than a predefined priority threshold value, the method 100 can assign 110 one or more communication channels of the at least two communication channels of the first control unit depending on the vehicle application associated with the data element and can transmit 112 the data element via the assigned one or more communication channels from the first control unit to the second control unit.

Figure 2:
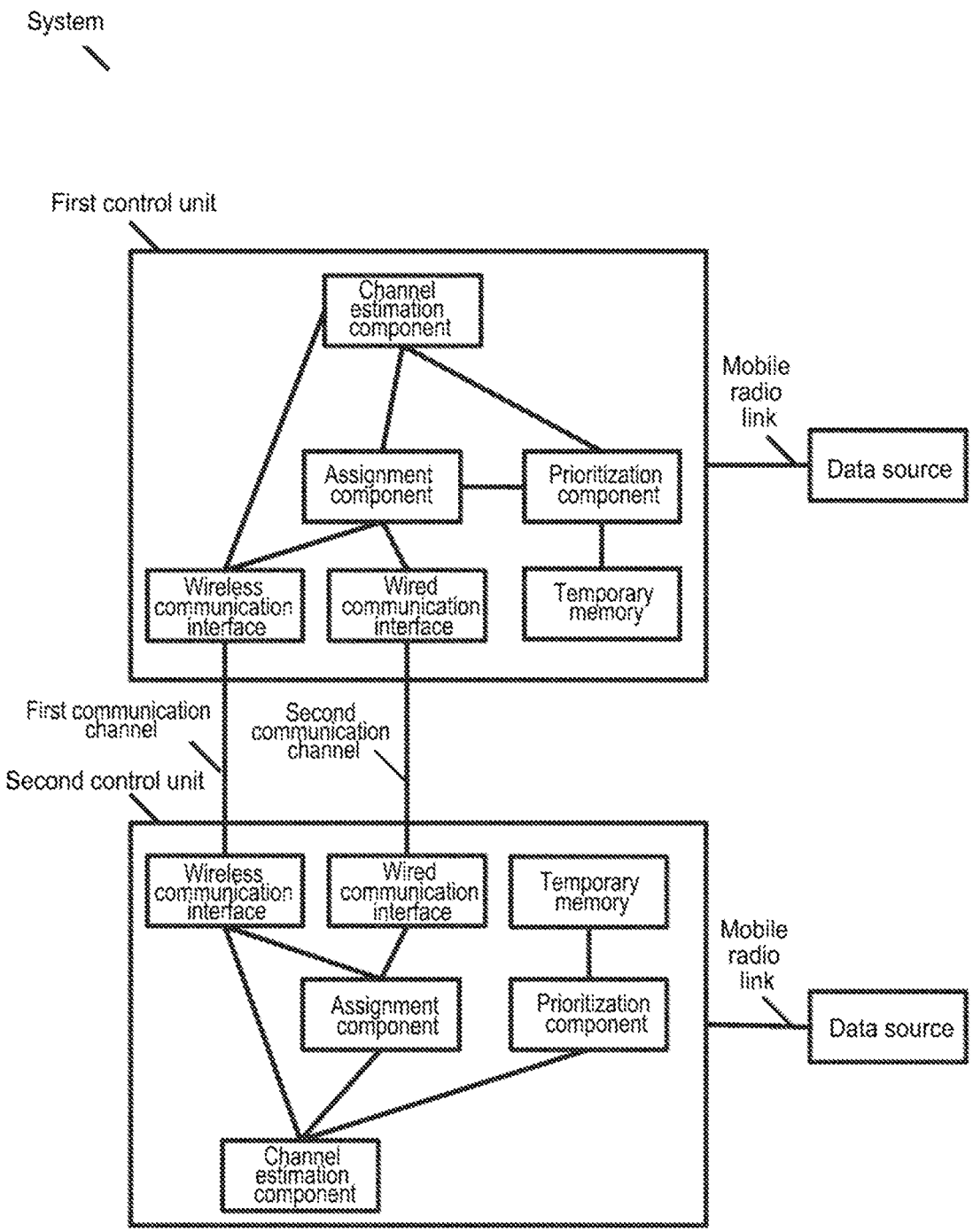
FIG. 2 shows an example of a system for transmitting a data element between a first control unit of a vehicle and a second control unit of the vehicle.

FIG. 2 shows an example of a system 200 for transmitting a data element between a first control unit 202 of a vehicle and a second control unit 204 of the vehicle. The first control unit 202 and the second control unit 204 can be telematics control units. The first control unit 202 and the second control unit 204 can in each case comprise a SIM card and a network access device, or NAD for short (not shown in FIG. 2). The first control unit 202 can, for example, provide a mobile radio link 206 for user-specific applications, and the second control unit 204 can provide a mobile radio link 206 for vehicle-specific applications. The mobile radio link 206 of the respective control unit can connect a data source 208, 210 to the vehicle. The vehicle can receive one or more data elements from the data source 208, 210 via the respective mobile radio links 206 of the control unit 202, 204.

The first control unit 202 and the second control unit 204 can comprise a wireless communication interface 212. A first communication channel 214 can be set up between the first control unit 202 and the second control unit 204 by means of the wireless communication interface 212. The first communication channel 214 is a wireless communication channel. The first control unit 202 is coupled to the second control unit 204 via the first communication channel 214. The first control unit 202 and the second control unit 204 can further comprise a wired communication interface 216. A second communication channel 218 can be set up between the first control unit 202 and the second control unit 204 by means of the wired communication interface 212. The second communication channel 218 is a wired communication channel. The first control unit 202 is coupled to the second control unit 204 via the second communication channel 218.

The first control unit 202 and/or the second control unit 204 can have a channel estimation component 220. The channel estimation component 220 can determine an estimated communication channel indicator for the wireless communication interface 212 of the respective control unit 202, 204 and/or the wireless communication channel 214 between the first control unit 202 and the second control unit 204. The estimated communication channel indicator can be representative of available transmission resources of the wireless communication channel 214. The channel estimation component can supply the communication channel indicator to a prioritization component 222 and to an assignment component 224.

The prioritization component 222 of the first control unit 202 or of the second control unit 204 can ascertain a priority of the data element received from the respective data source 208, 210. The priority of the data element can be determined depending on a vehicle application and/or a quality of service class of the data element.

If the communication channel indicator indicates that the available transmission of resources the wireless communication channel 214 between the first control unit 202 and the second control unit 204 are not sufficient for the transmission of the data element and the priority of the data element is less than a predefined priority threshold value, the prioritization component can store the data element in a temporary memory 226 for a predefined time interval. When the time interval elapses, the prioritization component 222 can again check whether a current communication channel indicator for the transmission of the data element indicates sufficient transmission resources.

The assignment component 224 can assign one or more communication channels 214, 218 for the transmission of the data element. A communication channel 214, 218 can have a communication profile. Availability and/or reliability, for example, can be specified in the communication profile for each communication channel. A quality of service class of the data element can further be linked to a vehicle application. The vehicle application and/or the quality of service class can define requirements for the communication channel. The assignment component can assign one or more communication channels for the transmission of the data element by comparing the communication profile with the requirements for the communication channel of the quality of service class. Data elements of the highest quality of service class, for example, can be transmitted via the communication channel(s) with the highest availability and reliability.

In the transmission of a data element which has a high requirement for a bandwidth of the communication channel, the wireless communication channel 214 can be used to extend the transmission resources of the wired communication channel 218. The wireless communication channel can transmit, for example, a part of the data element or the complete data element. The data element(s) can be distributed over the wireless communication channel 214 and/or the wired communication channel 218 depending on the vehicle application associated with the data element. A communication profile can be linked to the vehicle application. The communication profile can specify minimum requirements for the communication channel. The communication profile of the vehicle application can specify, for example, a bandwidth, a latency, real-time requirements, security requirements and/or error rates. These compared are with the communication profile of the communication channel and can be taken into account in the assignment of the communication channel(s). The communication profile of the vehicle application can specify, for example, that a security-relevant data element is transmitted exclusively via the wired communication channel, whereas a multimedia data element is preferably intended to be transmitted via the wireless communication channel.

The data exchange between the first control unit 202 and the second control unit 204 can advantageously be performed efficiently via different data transmission paths. The communication between the first control unit 202 and the second control unit 204 of the vehicle can be efficiently improved while retaining an application-specific transmission reliability. The application-specific transmission reliability can be defined, for example in the communication profile of the vehicle application. A requirement, for example, for the robustness of the communication channel which must be used for the transmission of the data element can be derived from the application-specific transmission reliability. As a result, the communication Further wired communication channels and the cable lines required for them can be efficiently avoided through the use of a wireless communication channel for the transmission of the data elements. Advantages of a wired communication channel can be efficiently combined with advantages of a wireless communication channel in order to transmit a data element of a vehicle application efficiently between the first control unit 202 and the second control unit 204.

REFERENCE NUMBER LIST

100 Method
102 Determine a communication channel indicator
104 Receive a data element
106 Ascertain a priority
108 Store the data element in a temporary memory
110 Assign one or more communication channels
112 Transmit the data element
200 System
202 First control unit
204 Second control unit
206 Mobile radio link
208 Data source
210 Data source
212 Wireless communication interface
214 First communication channel
216 Wired communication interface
218 Second communication channel
220 Channel estimation component
222 Prioritization component
224 Assignment component
226 Temporary memory

The invention claimed is:

1. A method for transmitting a data element between a first control unit of a vehicle and a second control unit of the vehicle, wherein the first control unit and the second control unit are coupled to one another via at least two communication channels, comprising:
determining using the first control unit a communication channel indicator of a first communication channel of the at least two communication channels, wherein the communication channel indicator is representative of available transmission resources of the first communication channel;
receiving using the first control unit a data element from a data source;
ascertaining a priority of the data element depending on a vehicle application associated with the data element; and
determining using the first control unit a communication channel indicator of a second communication channel of the at least two communication channels, wherein the communication channel indicator of the second communication channel is representative of available transmission resources of the second communication channel; and
if the communication channel indicator of the first communication channel and the communication channel indicator of the second communication channel indicate that the available transmission resources of the first communication channel and the available transmission resources of the second communication channel are not sufficient for the transmission of the data element and the priority of the data element is less than a predefined priority threshold value, then storing the data element in a temporary memory of the first control unit for a predefined time interval.

2. The method as claimed in claim 1, wherein the first communication channel is a wired communication channel and the second communication channel is a wireless communication channel.

3. The method as claimed in claim 2,
wherein at least one of the wireless communication channel, the first wireless communication channel, or the second wireless communication channel is a communication channel of a wireless local network; and/or
wherein the wired communication channel is a communication channel of an Ethernet network.

4. The method as claimed in claim 2, wherein the wired communication channel is a communication channel of an Ethernet network.

5. The method as claimed in claim 1, wherein the first communication channel is a first wireless communication channel and the second communication channel is a second wireless communication channel.

6. The method as claimed in claim 1,
wherein at least one of the first communication channel, or the second communication channel is a communication channel of a wireless local network.

7. The method as claimed in claim 1, the method further comprising,
if the communication channel indicator of the first communication channel indicates that the available transmission resources of the first communication channel are not sufficient for the transmission of the data element and the priority of the data element is greater than a predefined priority threshold value, then:
assigning at least two communication channels of the at least two communication channels of the first control unit depending on the vehicle application associated with the data element, and
transmitting the data element via the at least two assigned communication channels from the first control unit to the second control unit.

8. The method as claimed in claim 7, wherein at least one of the first control unit or the second control unit comprises a telematics control unit.

9. The method as claimed in claim 1, wherein the communication channel indicator of the first communication channel is an estimated communication channel indicator which is representative of estimated available transmission resources of the first communication channel.

10. The method as claimed in claim 1, wherein at least one communication channel of the at least two communication channels is a wired communication channel and at least one other communication channel of the at least two communication channels is a wireless communication channel, or
wherein the at least one communication channel of the at least two communication channels is a first wireless communication channel and the at least one other communication channel of the at least two communication channels is a second wireless communication channel.

11. The method as claimed in claim 1, wherein at least one of the first control unit or the second control unit comprises a telematics control unit.

12. The method as claimed in claim 1, further comprising:
knowing in the first control unit whether or not the first communication channel indicates that the available transmission resources of the first communication channel are sufficient for transmission of the data element and whether the priority of the data element is equal or greater than a predefined priority threshold value, and
if the communication channel indicator of the first communication channel indicates that the available transmission resources of the first communication channel are sufficient for the transmission of the data element and/or the priority of the data element is greater than a predefined priority threshold value, then:
assigning one or more communication channels of the at least two communication channels of the first control unit depending on the vehicle application associated with the data element, and
transmitting the data element via the assigned one or more communication channels from the first control unit to the second control unit.

13. The method as claimed in claim 12, wherein assigning the one or more communication channels of the first control unit depending on the vehicle application associated with the data element comprises:
receiving a communication profile, wherein the communication profile is linked to the vehicle application, and
allocating the one or more communication channels of the at least two communication channels depending on the communication profile of the vehicle application.

14. The method as claimed in claim 13, wherein the communication profile of the vehicle application specifies one or more communication-channel-specific parameters which the one or more communication channels of the at least two communication channels of the first control unit must fulfill for the transmission of the data element of the vehicle application.

15. A non-transitory computer-readable medium for transmitting a data element between a first control unit of a vehicle and a second control unit of the vehicle, wherein the computer-readable medium comprises instructions which, when executed on a control unit or computer, carry out the method as claimed in claim 1.

16. A system for transmitting a data element between a first control unit of a vehicle and a second control unit of the vehicle, wherein the system is designed to carry out the method as claimed in claim 1.

17. A vehicle comprising the system for transmitting a data element between a first control unit of a vehicle and a second control unit of the vehicle as claimed in claim 16.

* * * * *